No. 692,391. Patented Feb. 4, 1902.
A. WAGNER.
VALVE.
(Application filed Apr. 5, 1901.)
(No Model.)
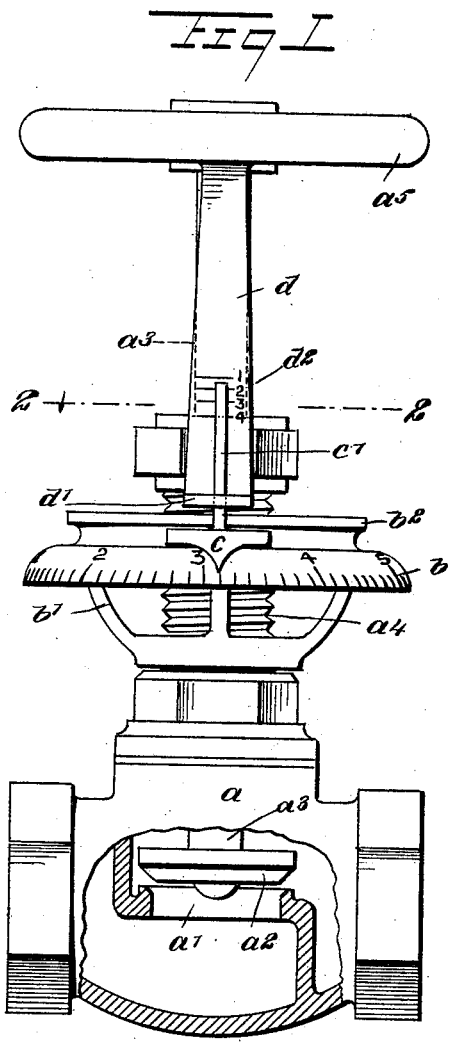
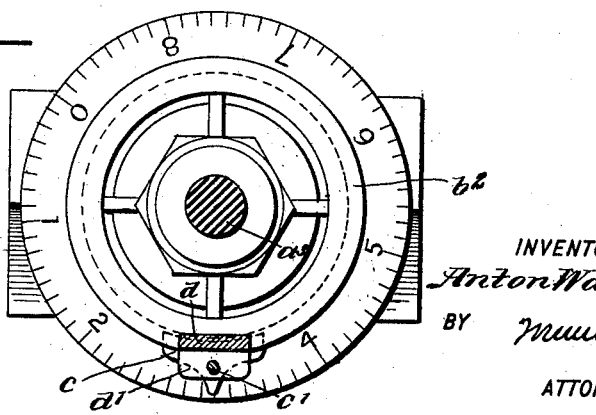
WITNESSES:
H. H. Walker
J. B. Owens
INVENTOR
Anton Wagner
BY
ATTORNEYS

UNITED STATES PATENT OFFICE.

ANTON WAGNER, OF MANVILLE, RHODE ISLAND.

VALVE.

SPECIFICATION forming part of Letters Patent No. 692,391, dated February 4, 1902.

Application filed April 5, 1901. Serial No. 54,471. (No model.)

*To all whom it may concern:*

Be it known that I, ANTON WAGNER, a citizen of the United States, and a resident of Manville, in the county of Providence and State of Rhode Island, have invented a new and Improved Valve, of which the following is a full, clear, and exact description.

The purpose of this invention is to enable a person having charge of a valve to tell exactly to what extent the valve has been moved, and thus accurately regulate the amount of fluid which may pass through it. This end I attain by providing a peculiarly-constructed scale used with the valve, so that all movements of the valve are recorded on the scale.

This specification is a specific description of one form of the invention, while the claims are definitions of the actual scope thereof.

Reference is to be had to the accompanying drawings, forming a part of this specification, in which similar characters of reference indicate corresponding parts in both views.

Figure 1 is a side view of the invention, partly broken away and in section; and Fig. 2 is a sectional plan view thereof on the line 2 2 of Fig. 1.

$a$ indicates the valve-casing, containing the seat $a'$ and valve $a^2$.

$a^3$ indicates the valve-stem, which screws in the bonnet $a^4$ of the valve in the usual manner.

$b$ indicates a circular scale, which is connected by a spider $b'$ with the bonnet $a^4$, so that the scale is held stationary on the bonnet. This scale $b'$ is provided at its upper edge with an outwardly-overhanging flange $b^2$. Arranged to travel around the scale is a pointer $c$, which has its inner edge fitted under the flange $b^2$, this flange permitting the horizontal movement of the pointer, but preventing its vertical movement.

$d$ indicates an arm which is attached rigidly to the valve-stem or to the hand-wheel $a^5$ thereof. This arm projects downwardly to a point immediately over the flange $b^2$ and is there formed with a laterally-turned end $d'$, in which is slidably fitted a pin $c'$, carried by the pointer $c$. This pin $c'$ is adapted to read on a scale $d^2$ on the arm $d$.

Now assuming that the parts are so assembled and adjusted that when the valve $a^2$ is on its seat the pointer $c$ will lie at zero on the scale-rim $b$ and the upper end of the rod $c'$ will lie on the graduation 1 of the scale $d^2$, when the stem of the valve is turned the arm $d$ will move around with it and carry the pointer $c$ along the scale-rim $b$, the pointer indicating against the scale on said rim. The valve-stem will move upward as the valve unseats and will carry with it the arm $d$. This will cause the scale $d^2$ to move relatively to the rod $c'$. The various parts should be adjusted so that when the valve-stem has made a single revolution the arm $c'$ will point to the second graduation on the scale $d^2$. When the stem is turned in a third revolution, the rod $c'$ will point to a third graduation, and so on. It therefore will be seen that one by a glance at the valve may determine exactly to what extent the valve is open. This enables engineers and other machine operators to accurately adjust the valve, and, having once found the necessary adjustments, other adjustments may be quickly reached without necessitating a continual experiment, such as is now necessary.

It will thus be observed that there are two scales differing in kind, one being a coarse-measure scale dealing with large units and the other being a form of micrometer-scale dealing with small units, the two scales being harmoniously combined, so as to coact with each other something like the respective second and minute hands of a timepiece.

Having thus described my invention, I claim as new and desire to secure by Letters Patent—

1. A valve provided with a movable stem and with a coarse-measure scale for measuring approximately the motions of said stem, in combination with a micrometer-scale for measuring said motions exactly.

2. A valve provided with a revoluble and longitudinally-movable stem and with two coacting scales, one of said scales for registering the number of revolutions made by said stem, and the other for measuring subdivisions of a single revolution thereof.

3. A valve provided with a revoluble and longitudinally-movable stem with which a rigid arm is connected so as to partake of the motions thereof, in combination with a member slidably secured to said arm and free to revolve therewith in a fixed plane only, and a scale-rim located in another fixed plane parallel to the said fixed plane.

4. The combination with a valve, of a scale-rim held stationary thereon and having an overhanging flange, a pointer running on the scale-rim and engaging said flange, an arm arranged to turn with the valve-stem and having a scale thereon, and a rod connected to the pointer or indicator and having sliding connection with the arm, the rod reading on the scale of the arm.

5. A valve provided with a revoluble and longitudinally-movable stem with which a rigid arm is connected so as to partake of the motions thereof, a member provided with a plurality of pointers and slidably secured to said rigid arm so that said pointers will travel in different paths, and a plurality of graduated surfaces located parallel with the respective paths traveled by said pointers.

6. A valve provided with a revoluble and longitudinally-movable stem, in combination with a longitudinally-disposed scale for measuring longitudinal movements in said stem, and a radially-disposed scale for measuring radial movements thereof.

7. The combination, with a valve, of a scale-rim mounted in a fixed plane thereon, a longitudinal scale-arm also mounted thereon and perpendicular to said scale-rim, a traveling pointer located thereon in a plane parallel to the scale-rim, and another traveling pointer, also located thereon, in a line parallel to said scale-arm.

In testimony whereof I have signed my name to this specification in the presence of two subscribing witnesses.

ANTON WAGNER.

Witnesses:
 FRANK HARRIS KNIGHT,
 LEVI BATEMAN.